United States Patent
Melaragni et al.

(10) Patent No.: US 9,855,918 B1
(45) Date of Patent: Jan. 2, 2018

(54) PROXIMITY CONFIRMING PASSIVE ACCESS SYSTEM FOR VEHICLE

(71) Applicant: GM GLOBAL TECHNOLOGY OPERATIONS LLC, Detroit, MI (US)

(72) Inventors: Michael J. Melaragni, Rochester, MI (US); William A. Biondo, Beverly Hills, MI (US); David T. Proefke, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/228,828

(22) Filed: Aug. 4, 2016

(51) Int. Cl.
*H04W 12/08* (2009.01)
*H04W 4/00* (2009.01)
(Continued)

(52) U.S. Cl.
CPC .............. *B60R 25/24* (2013.01); *B60R 25/01* (2013.01); *B60R 25/209* (2013.01); *B60R 25/33* (2013.01);
(Continued)

(58) Field of Classification Search
CPC ............ G07C 2209/63; G07C 9/00309; G07C 2009/00793; G07C 9/00174; G07C 2209/64; G07C 2009/00317; G07C 2009/00388; G07C 2009/00507; G07C 2009/00365; G07C 2009/00769; G07C 2009/00357; G07C 2009/00412; G07C 2009/00555; G07C 2209/62; G07C 9/00658; G01S 5/0252; G06F 17/00; G06F 3/011; G06F 3/0481; G06F 3/0484; G06F 3/04883; G06F 3/167; G06Q 30/0266; G09F 2027/001; G09F 21/048; G09F 27/005; H04L 67/12; H04M 1/72527; H04W 12/04; H04W 12/08; H04W 12/10; H04W 4/008; H04W 4/02; H04W 4/021; H04W 4/022; H04W 4/04; H04W 4/046;
(Continued)

(56) References Cited

U.S. PATENT DOCUMENTS

2006/0114100 A1* 6/2006 Ghabra .................... E05B 81/78
340/5.61
2010/0073133 A1* 3/2010 Conreux ............. G07C 9/00111
340/5.67
(Continued)

*Primary Examiner* — Dionne H Pendleton
(74) *Attorney, Agent, or Firm* — Lorenz & Kopf, LLP

(57) ABSTRACT

A method for controlling access to a vehicle function includes communicating, between a vehicle controller and a portable controller, a plurality of signals. The plurality of signals include an authentication signal and a location signal. The method also includes processing, by at least one of the vehicle controller and the portable controller, the authentication signal during an authentication confirmation process to determine authentication of the portable device. The method further includes processing, by at least one of the vehicle controller and the portable controller, the location signal during a proximity confirmation process to determine whether the portable device is within a predetermined proximity of the vehicle. Additionally, the method includes providing access to the vehicle function of the component when the portable device is authenticated and the portable device is within the predetermined proximity of the vehicle.

15 Claims, 5 Drawing Sheets

(51) Int. Cl.
  *G06F 17/00* (2006.01)
  *B60R 25/24* (2013.01)
  *B60R 25/20* (2013.01)
  *B60R 25/01* (2013.01)
  *B60R 25/33* (2013.01)
  *G01S 5/02* (2010.01)
  *G07C 9/00* (2006.01)
(52) U.S. Cl.
  CPC ... *B60R 2325/108* (2013.01); *B60R 2325/205* (2013.01); *G01S 5/0252* (2013.01); *G07C 2009/00317* (2013.01); *G07C 2009/00365* (2013.01); *G07C 2009/00388* (2013.01); *G07C 2009/00769* (2013.01)
(58) Field of Classification Search
  CPC .. H04W 64/003; H04W 84/18; B60R 16/037; B60R 25/00; B60R 25/24; E05B 2047/002; E05B 2047/0048; E05B 2047/0058; E05B 2047/0072; E05B 2047/0095; E05B 2047/0097; E05B 47/00; E05B 47/0012; E05B 47/026; E05B 81/78
  See application file for complete search history.

(56) References Cited

U.S. PATENT DOCUMENTS

| | | | |
|---|---|---|---|
| 2010/0271171 A1* | 10/2010 | Sampei | B60R 25/00 340/5.6 |
| 2011/0257817 A1* | 10/2011 | Tieman | B60R 25/24 701/2 |
| 2013/0332007 A1* | 12/2013 | Louboutin | H04W 4/021 701/2 |
| 2016/0189459 A1* | 6/2016 | Johnson | G07C 9/00309 340/5.61 |
| 2016/0261969 A1* | 9/2016 | Venkatraman | H04W 4/028 |
| 2017/0111798 A1* | 4/2017 | Dieckmann | H04L 67/12 |

* cited by examiner

PROXIMITY CONFIRMING PASSIVE ACCESS SYSTEM FOR VEHICLE

CROSS REFERENCE TO RELATED APPLICATIONS

None.

STATEMENT REGARDING FEDERALLY SPONSORED RESEARCH OR DEVELOPMENT

None.

TECHNICAL FIELD

The technical field generally relates to a passive access system for a vehicle and, more particularly, relates to a proximity confirming passive access system for a vehicle.

INTRODUCTION

Some vehicles include systems that enable certain vehicle functions with little to no manual input needed from a user. These systems are sometimes referred to as "passive access systems".

Some passive access systems may be vulnerable to so-called "relay attacks" or "man-in-the-middle" attacks. Typically, in these attacks, unauthorized users gain access to the vehicle even though the remote device is out-of-range of the vehicle controller. A first unauthorized user near the vehicle wirelessly relays the challenge signal from the vehicle controller to a second unauthorized user that is proximate the remote device. The remote device, upon receiving the relayed challenge signal, outputs the authentication signal. The second unauthorized user relays the authentication signal back to the first unauthorized user so that the vehicle controller receives the authentication signal. The vehicle controller, thus, unlocks the vehicle doors, enables engine start, etc. Accordingly, the first unauthorized user is able to gain access even though the remote device is far away from the vehicle.

Accordingly, it is desirable to provide a passive access system for a vehicle that is more secure than those of the prior art. It is also desirable to provide a passive access system that is less susceptible to relay attacks. These and other desirable features and characteristics of the present disclosure will become apparent from the subsequent detailed description and the appended claims, taken in conjunction with the accompanying drawings and the foregoing technical field and background.

SUMMARY

A method is provided for controlling access to a predetermined function of a component within a system that includes a vehicle and a portable device. The vehicle includes a vehicle controller and the portable device including a portable controller. The vehicle is configured to wirelessly communicate with the portable device. The method includes communicating, between the vehicle controller and the portable controller, a plurality of signals. The plurality of signals include an authentication signal and a location signal. The method also includes processing, by at least one of the vehicle controller and the portable controller, the authentication signal during an authentication confirmation process to determine authentication of the portable device with respect to the vehicle. The method further includes processing, by at least one of the vehicle controller and the portable controller, the location signal during a proximity confirmation process to determine whether the portable device is within a predetermined proximity of the vehicle. Additionally, the method includes: providing access to the predetermined function of the component when the portable device is authenticated with respect to the vehicle according to the authentication confirmation process; and the portable device is within the predetermined proximity of the vehicle according to the proximity confirmation process.

Also, a vehicle is provided for controlling access to a function according to wireless communications with at least one portable device. The vehicle includes a vehicle controller including an authentication module and a location module. The vehicle also includes a vehicle communication device configured to wirelessly communicate with at least one portable device using a first communication protocol and a second communication protocol. Furthermore, the vehicle includes a vehicle component configured to selectively perform a predetermined function. The vehicle controller is configured to receive, via the vehicle communication device and using the first communication protocol, an authentication signal from the at least one portable device. The vehicle controller is configured to receive, via the vehicle communication device and using the second communication protocol, a location signal from the at least one portable device, the location signal depending at least partly on a location of the portable device. The vehicle controller is configured to process the authentication signal during an authentication confirmation process to determine authentication of the at least one portable device with respect to the vehicle. The vehicle controller is configured to process the location signal during a proximity confirmation process to determine whether the at least one portable device is within a predetermined proximity of the vehicle. The vehicle controller is configured to send a control signal to the vehicle component for performing the predetermined function when both: the at least one portable device is authenticated with respect to the vehicle according to the authentication confirmation process; and the at least one portable device is within the predetermined proximity of the vehicle according to the proximity confirmation process.

Additionally, a method is provided for controlling access to a predetermined function of a component of a vehicle based on wireless communications between the vehicle and a portable device. The vehicle includes a vehicle controller and the portable device includes a portable device controller. The method includes transmitting, from the vehicle to the portable device, a challenge signal. The method also includes receiving, by the vehicle, an authentication signal from the portable device in response to the challenge signal. Moreover, the method includes processing, by the vehicle controller, the authentication signal during an authentication confirmation process to determine authentication of the portable device with respect to the vehicle. Furthermore, the method includes receiving, by the vehicle, a location signal from the portable device, the location signal depending at least partly on a location of the portable device relative to the vehicle. The method additionally includes processing, by the vehicle controller, the location signal during a proximity confirmation process to determine whether the portable device is within a predetermined proximity of the vehicle. Also, the method includes providing, by the vehicle controller, access to the predetermined function of the component of the vehicle when both: the portable device is authenticated with respect to the vehicle according to the authentication confirmation process; and the portable device is within the predetermined proximity of the vehicle according to the proximity confirmation process.

DESCRIPTION OF THE DRAWINGS

The exemplary embodiments will hereinafter be described in conjunction with the following drawing figures, wherein like numerals denote like elements, and wherein.

DETAILED DESCRIPTION

Passive access systems may automatically unlock and/or open a vehicle door as the user approaches the car, touches a door handle, or otherwise provides another passive input to the system. The automatic unlocking and/or opening function may occur without the user, for example, manually pressing an UNLOCK or OPEN button a remote control. Additional systems may automatically enable engine start, actuate windows and/or sunroofs, and/or provide access to other vehicle functions.

Passive access systems may include a vehicle controller and a remote device, such as a key fob. The vehicle controller wirelessly communicates with the remote device to authenticate the remote device. Specifically, upon receiving an input, the vehicle controller sends a challenge signal, and the remote device responds with an authentication signal. Then, the vehicle controller processes the response and confirms that the authentication signal is a correct response via computation or comparison to a previously computed value in computerized memory. If so, the vehicle controller authenticates the remote device and unlocks the vehicle doors, enables engine start, or enables another predetermined function of the vehicle. Due to the potential for relay attacks, it is desirable to confirm that the remote device is proximate the vehicle before access is granted to a certain function (e.g., door unlocking, enabling engine start, etc.).

The following detailed description is merely exemplary in nature and is not intended to limit the application and uses. Furthermore, there is no intention to be bound by any expressed or implied theory presented in the preceding technical field, background, brief summary or the following detailed description.

Figure 1:
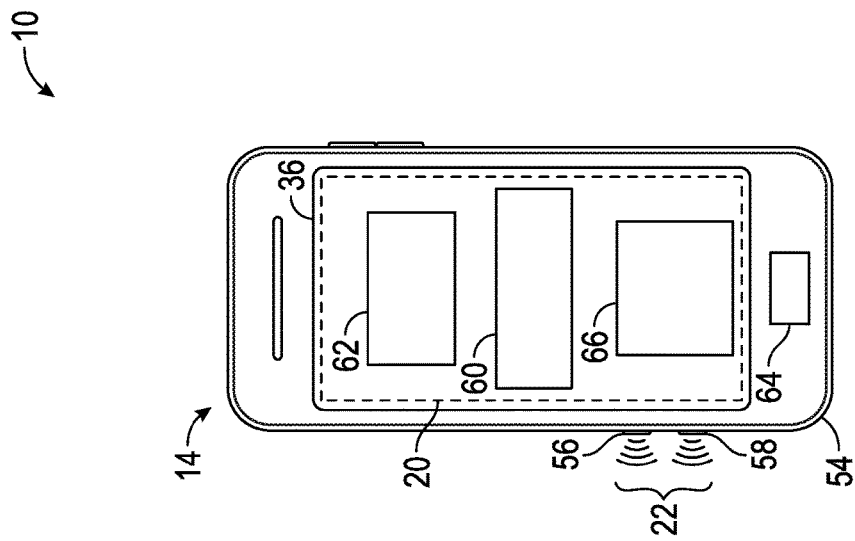
FIG. 1 is a schematic view of a passive access system according to exemplary embodiments of the present disclosure.
Figure 1:
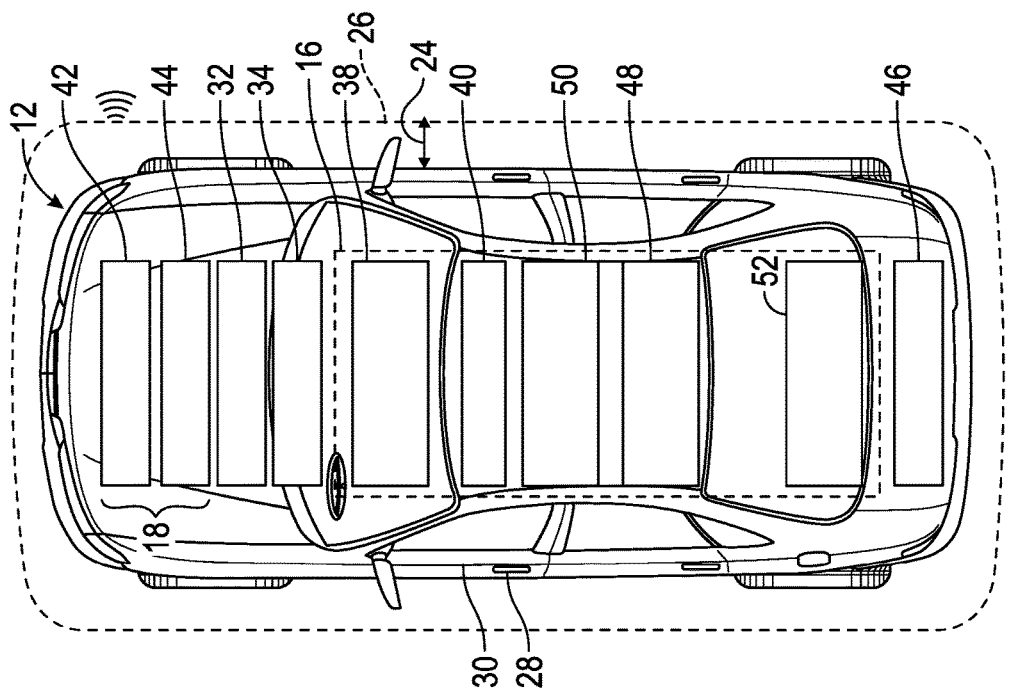

Referring initially to FIG. 1, a passive access system 10 is illustrated schematically according to exemplary embodiments. As will be discussed, the system 10 and its methods of use is implemented with a vehicle 12 and at least one portable device 14.

The vehicle 12 may be a car, truck, motorcycle, SUV, military vehicle, aircraft, watercraft, or other type of vehicle. Generally, the vehicle 12 includes a vehicle controller 16 and a vehicle communication device 18.

Additionally, the portable device 14 may a smart phone, a key fob, a tablet, a laptop computer, or other portable device. The portable device 14 includes at least one portable controller 20 and at least one portable communication device 22. The portable device 14 wirelessly communicates with the vehicle 12 via intercommunication between the vehicle communication device 18 and the portable communication device 22. Furthermore, as will be discussed, the system 10 may include a single portable device 14, or the system 10 may include multiple portable devices 14 that are each in communication with the vehicle 12 and/or each other.

Generally, the vehicle 12 and the portable device(s) 14 wirelessly communicate via the communication devices 18, 22 to: (a) authenticate the portable device 14 with respect to the vehicle 12; and (b) ensure that the portable device 14 is within a predetermined proximity 24 of the vehicle 12. In the illustrated embodiment, the vehicle 12 authenticates the portable device 14 and also confirms that the portable device 14 is within a predetermined imaginary boundary 26 of the vehicle 12. In some scenarios, the owner of the vehicle 12 (i.e., an authorized user of the system 10) is in possession of the portable device 14. Thus, as the user approaches the vehicle 12, the vehicle 12 and the portable device 14 communicate to, in effect, authenticate the user and confirm that the user is within the predetermined proximity 24 of the vehicle 12.

In some embodiments, authentication includes the vehicle 12 transmitting a challenge signal to the portable device 14 and the portable device 14 responding with an authentication signal. The authentication signal, in some embodiments, is computed by the portable device 14 via use of an algorithm and secret information shared between the portable device 14 and the vehicle 12, similar to techniques used in Advanced Encryption Standard (AES) or other encryption techniques. Also, in some embodiments, proximity confirmation includes the vehicle 12 and the portable device 14 establishing wireless communication with each other via a short-range communication protocol (i.e., a location- or proximity-dependent communication protocol, such as BLUETOOTH' or a near-field communication protocol). In additional embodiments, proximity confirmation includes detecting the geographical location of the vehicle 12, detecting the geographical location of the portable device 14, secure communication of the detected locations between the vehicle 12 and the portable device 14, and comparing the detected locations to determine whether the portable device 14 is within the predetermined boundary 26 of the vehicle 12.

In some embodiments, authentication occurs using a first wireless communication protocol, and proximity confirmation occurs using a different, second wireless communication protocol. Specifically, in some embodiments, authentication occurs using a first radio communication protocol, and proximity confirmation occurs using a second radio communication protocol that is out-of-band from the first radio communication protocol.

Once the system 10 authenticates the portable device 14 and confirms that the portable device 14 is within the predetermined proximity 24 of the vehicle 12, the system 10 enables, commences, or otherwise provides access to a predetermined function of a component of the vehicle 12 and/or the portable device 14. For example, in some embodiments, a door lock 28 automatically unlocks a vehicle door 30 or enables unlocking upon further operator action such as actuation of a door handle. Furthermore, in some embodiments, a vehicle engine 32 starts automatically, a starter of the engine 32 energizes to allow user to selectively start the engine 32, or engine starting is otherwise enabled upon further operator action such as actuation of an engine start switch. Additionally, in some embodiments, a display 34 of the vehicle 12 automatically initiates welcome lighting, displays a welcome message, or displays other notification to the user. In additional embodiments, once the system 10 authenticates the portable device 14 and confirms that the portable device 14 is within the predetermined proximity 24 of the vehicle 12, the system 10 enables one or more predetermined functions of the portable device 14. For example, a display 36 of the portable device 14 automatically displays a welcome message or other message to the user.

Access is provided in a passive manner, meaning that the user need not provide direct input for gaining access. For example, in some embodiments the door lock 28 unlocks automatically without the user having to press a designated UNLOCK button on a remote control. In additional embodiments, energizing of the starter of the engine 32, displaying messages on one or both displays 34, 36, etc. occur passively as well. Accordingly, the system 10 provides added conveniences for the user.

Additionally, the system 10 enhances security and prevents unauthorized users from gaining access to the system 10 and its functions. This is because the system 10 confirms that the portable device 14 is both authenticated and proximate the vehicle 12. As an example, so-called "relay attacks" or "man-in-the-middle attacks" on the system 10 are likely to fail because such attacks typically occur when the portable device 14 is relatively far away from the vehicle 12 (i.e., outside the boundary 26 of proximity 24). Accordingly, in such a "relay attack," the system 10 might authenticate the portable device 14 with respect to the vehicle 12; however, the system 10 would likely recognize that the portable device 14 is outside the boundary 26 of proximity 24 of the vehicle 12 and prevent the attacker from gaining access.

These concepts and features will be discussed in greater detail below according to exemplary embodiments of the present disclosure. It will be appreciated that the system 10 and its method of use can vary from those discussed without departing from the scope of the present disclosure. Before discussing the embodiments in detail, several terms and their meanings are explained.

As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

Conventional techniques related to signal processing, data transmission, signaling, control, and other functional aspects of the systems (and the individual operating components of the systems) may not be described in detail herein for brevity. Furthermore, the connecting lines and other groupings shown in the various figures contained herein are intended to represent example functional relationships and/or physical couplings between the various elements. It should be noted that many alternative or additional functional relationships or physical connections may be present in an embodiment of the present disclosure.

Referring now to FIG. 1, the vehicle 12 will be discussed in detail according to exemplary embodiments. The vehicle 12 includes the controller 16, and the controller 16 includes an authentication module 38 for authenticating the portable device 14 as will be explained. The controller 16 also includes a location module 40 for confirming that the portable device 14 is within the boundary 26 of proximity 24 of the vehicle 12. Moreover, the controller 16 generates control signals for controlling various components of the vehicle as will be explained in further detail.

Additionally, the vehicle 12 includes the vehicle communication device 18. In some embodiments, the vehicle communication device 18 includes a plurality of transceivers that provide wireless communication according to different communication protocols. For example, the communication device 18 comprises a first transceiver 42 and a second transceiver 44. The first transceiver 42 provides wireless communication within a first radio bandwidth, and the second transceiver 44 provides wireless communication within a second radio bandwidth that is out-of-band from the first radio bandwidth. Specifically, in some embodiments, the first transceiver 42 communicates at a frequency of 315 MHz or 433.92 MHz as appropriate for various North American, European, Japanese, and Asian markets. In contrast, the second transceiver 44 communicates at a frequency of approximately 2.45 GHz (e.g., between approximately 2.402 GHz and 2.480 GHz). More specifically, in some embodiments, the second transceiver 44 is a BLUETOOTH™ enabled transceiver 44. In additional embodiments, the second transceiver 44 is enabled for near-field communication.

Moreover, the vehicle 12 includes at least one location sensor 46, which is configured to detect a geographical location of the vehicle 12. In some embodiments, the sensor 46 directly receives signals from Global Positioning System (GPS) satellites. In additional embodiments, the sensor 46 is in communication (e.g., via a cellular or Wi-Fi network) with a GPS. In additional embodiments, the sensor 46 detects the geographical location of the vehicle 12 using laser triangulation.

In some embodiments, the vehicle controller 16 authenticates the portable device 14 (i.e., the vehicle controller 16 performs an authentication confirmation process). For example, in some embodiments, the vehicle controller 16 utilizes the authentication module 38 for generating and transmitting a challenge signal via the first vehicle transceiver 42. The challenge signal may be randomly generated by the vehicle controller 16 in some embodiments. Also, the vehicle 12 transmits the challenge signal, and if the portable device 14 responds with the correct authentication signal (as verified using a shared encryption algorithm and secret information), then the system 10 authenticates the portable device 14 with respect to the vehicle 12. If, on the other hand, the portable device 14 fails to respond with the correct authentication signal (i.e., fails to provide the correct authentication response), then the system 10 does not authenticate the portable device 14 with respect to the vehicle 12.

Also, in some embodiments, the vehicle controller 16 determines the geographical location of the vehicle 12 at predetermined instances. For example, the vehicle controller 16 receives data input from the vehicle location sensor 46 and processes the data using the location module 40 to determine the geographical location of the vehicle 12. As will be discussed, in some embodiments, the vehicle controller 16 utilizes this detected vehicle location to confirm that the portable device 14 is within the predetermined proximity 24 of the vehicle 12.

The vehicle 12 also includes one or more components that provide certain functions. For example, the vehicle 12 includes a door lock 28, engine 32, and/or display 34. The door lock 28 selectively locks and unlocks the vehicle door(s) 30. The engine 32 may be an internal combustion, electric, or other type of engine, and may be selectively turned ON and OFF. When the engine 32 is ON, the engine 32 may provide power through a powertrain to wheels of the vehicle for propelling the vehicle 12. The display 34 may include an LCD display, an LED display, a projector, or other type of display device for displaying a message to the user.

The system 10 controls the functions of the door lock 28, engine 32, and display 34 based on whether the portable device 14 is authenticated and whether the portable device 14 is within the boundary 26 of proximity 24 of the vehicle 12. To this end, the controller 16 includes a lock control module 48 for controlling the door lock 28, an engine control module 50 for controlling the engine 32, and/or a display control module 52 for controlling the display 34. It will be appreciated that the system 10 may control access to other functions without departing from the scope of the present disclosure. For example, the vehicle 12 may include window actuators that actuate to open and close windows, convertible roof actuators that actuate to open and close a convertible roof, speakers that output auditory messages, and others. The system 10 can similarly restrict access to the functions of these component as well without departing from the scope of the present disclosure.

Furthermore, it will be understood that the boundary 26 indicated in FIG. 1 is an imaginary and invisible boundary. In some embodiments, the boundary 26 extends continuously about and surrounds the vehicle 12. The boundary 26 may be spaced apart from the vehicle 12 at any predetermined distance (indicated by arrow 24). For example, the boundary 26 is spaced away approximately three meters or less from the exterior of the vehicle 12. Thus, when the system 10 determines that the portable device 14 is within the boundary 26, the system 10 confirms that the portable device 14 is within the predetermined proximity 24 to the vehicle 12.

As mentioned above, the system 10 also includes one or more portable devices 14. The portable device(s) 14 will now be explained in detail according to exemplary embodiments.

In the embodiment of FIG. 1, the system 10 includes a single portable device 14 that includes the portable controller 20, the portable communication device 22, and the portable display 36, each supported together by a housing 54. The portable device 14 may be a smart phone, a tablet, a key fob, a laptop computer, or other computerized device.

In some embodiments, the portable communication device 22 comprises a first portable transceiver 56 and a second portable transceiver 58. The first portable transceiver 56 provides two-way communication with the first vehicle transceiver 42, and the second portable transceiver 58 provides two-way communication with the second vehicle transceiver 44 in some embodiments. Also, in some embodiments, the first portable transceiver 56 communicates either at a frequency of 315 MHz or at a frequency of 433.92 MHz. In contrast, the second portable transceiver 58 communicates at a frequency of approximately 2.45 GHz (e.g., between approximately 2.402 GHz and 2.480 GHz). More specifically, in some embodiments, the second portable transceiver 58 is a BLUETOOTH' enabled transceiver 58. In additional embodiments, the second portable transceiver 58 is enabled for near-field communication.

Additionally, in some embodiments, the portable device 14 includes a portable location sensor 64. In some embodiments, the sensor 64 receives signals directly from GPS satellites. In other embodiments, the sensor 64 communicates (e.g., via a cellular or Wi-Fi network) with a GPS. In additional embodiments, the sensor 64 detects the geographical location of the portable device 14 using laser triangulation.

In some embodiments, the portable controller 20 includes a processor, logic, memory, and other features. Also, the portable controller 20 includes an authentication module 60 used when authenticating the portable device 14. For example, in some embodiments, the controller 20 utilizes the authentication module 60 to generate an authentication signal in response to the challenge signal received from the vehicle 12. The portable controller 20 transmits the authentication signal back to the vehicle 12 via the first portable transceiver 56. In some embodiments, the authentication signal is computed by the portable controller 20 using information and algorithms shared with the vehicle 12. In other embodiments, the authentication signal may be a preselected and tailored response to the specific challenge signal received from the vehicle 12.

The portable controller 20 also includes a location module 62. In some embodiments, the portable controller 20 utilizes the location module 62 when determining the geographical location of the portable device 14. For example, the portable controller 20 receives data input from the portable location sensor 64 and processes the data using the location module 62 to determine the geographical location of the portable device 14. Subsequently, the portable controller 20 generates a signal corresponding to the detected location of the portable device 14. The portable controller 20 transmits this signal to the vehicle 12 via the second portable transceiver 58 for confirming that the portable device 14 is within the predetermined proximity 24 of the vehicle 12 as will be discussed in greater detail below. In some embodiments, the location information is encrypted using a common algorithm and shared secret information prior to transmission to the vehicle 12.

Moreover, the portable controller 20 includes a display control module 66. The portable controller 20 utilizes the display control module 66 for controlling the portable display 36 in some embodiments.

Figure 2:
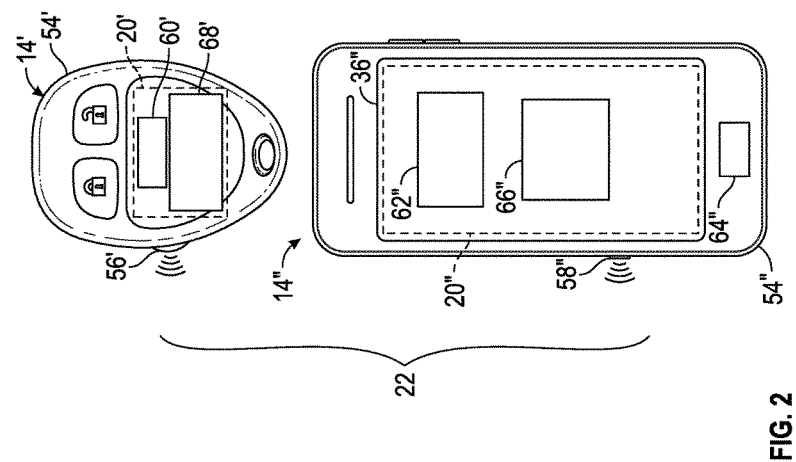
FIG. 2 is a schematic view of the passive access system according to additional exemplary embodiments of the present disclosure.
Figure 2:
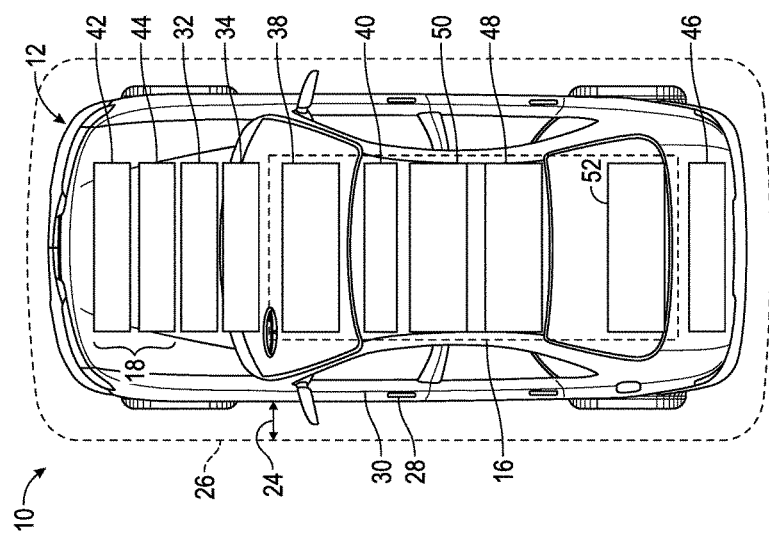

FIG. 2 illustrates the system 10 according to additional embodiments of the present disclosure. The system 10 of FIG. 2 shares one or more common features with the system 10 of FIG. 1. However, the system 10 of FIG. 2 includes a plurality of portable devices (e.g., a first portable device 14' and a second portable device 14").

In some embodiments, the first portable device 14' includes a first controller 20' and the first portable transceiver 56', which are supported by a respective first housing 54'. The first controller 20' includes the authentication module 60' and a vehicle control module 68'. The first controller 20' utilizes the vehicle control module 68' for generating control signals for controlling the door lock 28 of the vehicle 12, the engine 32 of the vehicle 12, and/or the display 34 of the vehicle 12. The first controller 20' additionally includes a respective processor in some embodiments.

Also, in some embodiments, the second portable device 14" includes a second controller 20" with the location module 62" and the display control module 66", the second portable transceiver 58", the portable display 36", and the portable location sensor 64", each of which are supported by a respective second housing 54". In some embodiments, the first portable device 14' may be a key fob, whereas the second portable device 14" may be a smart phone, a tablet, or a laptop.

In some embodiments, the first transceiver 56' provides two-way communication with the first transceiver 42 of the vehicle 12, and/or the second transceiver 58" provides two-way communication with the second transceiver 44 of the vehicle 12. Additionally, in some embodiments, the first transceiver 56' and the second transceiver 58" communicate with each other to provide one- or two-way communications between the portable devices 14', 14". Regardless, it will be appreciated that the first and second transceivers 56', 58" collectively comprise the portable communication device 22 despite being included on separate devices.

Additionally, in some embodiments, the first portable device 14' communicates with the vehicle 12 for authentication confirmation, and the second portable device 14" communicates with the vehicle 12 for confirming proximity to the vehicle 12. It will be appreciated that a user simultaneously possesses both the first and second portable devices 14', 14". Accordingly, the methods of operating the system 10 of FIG. 1 resemble the methods of using the system 10 of FIG. 2 except as noted. For purposes of brevity, the following description of methods of operating the system 10 will refer primarily to the embodiment of FIG. 1. It will be appreciated, however, that the methods discussed may be employed with the system 10 of FIG. 2 as well. Any potential differences between the methods of operating the system 10 of FIG. 1 and the system 10 of FIG. 2 will be noted below.

Figure 3:
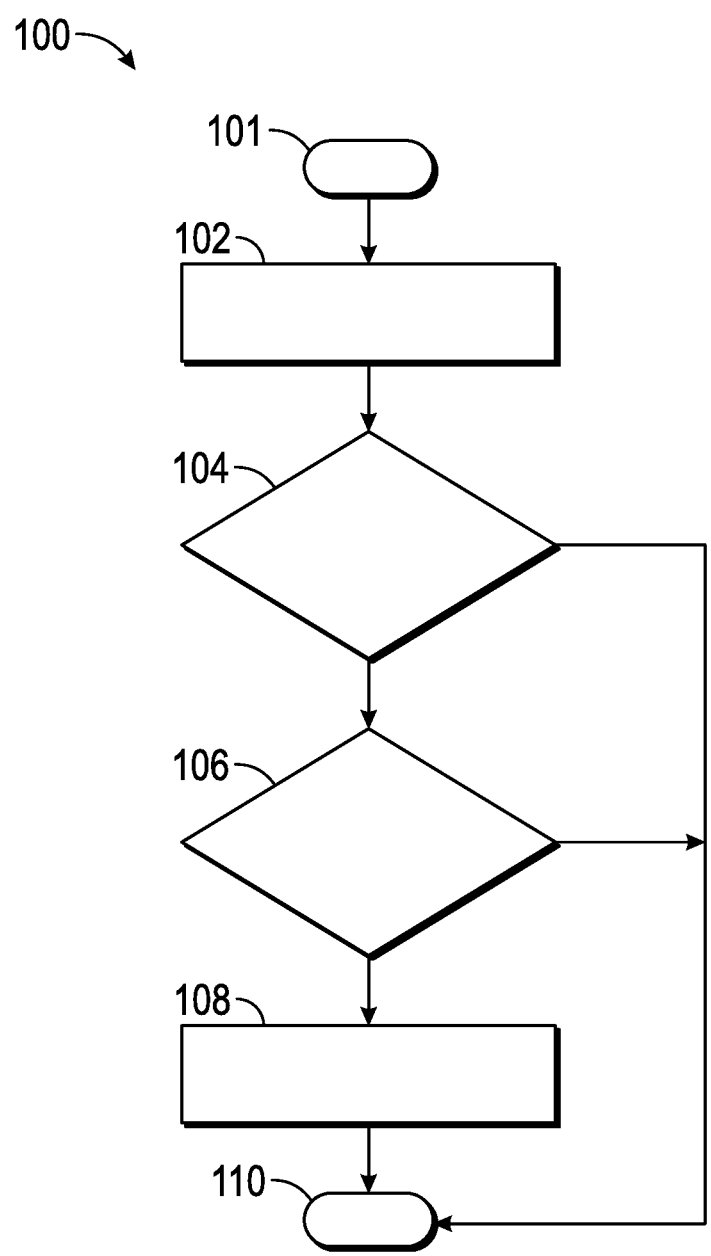
FIG. 3 is a flowchart illustrating a method of operating the passive access system according to exemplary embodiments of the present disclosure.

FIG. 3 illustrates a method 100 of operating the passive access system 10 according to exemplary embodiments. As shown, the method 100 begins at 101 and at 102, the method includes receiving an initial input. In some embodiments, the vehicle 12 receives the input of 102. The input may be of various types, such as a user pulling on or otherwise manipulating the handle of the door 30. In additional embodiments, the method 100 at 102 includes the vehicle controller 16 monitoring for and receiving an authentication request signal sent from the portable device 14 via the first transceiver 56.

Next, at 104, it may be determined whether the portable device 14 is authenticated with the vehicle 12. For example, in some embodiments, the vehicle 12 outputs the challenge signal via the first transceiver 42, the portable device 14 replies with an authenticating signal via the first transceiver 56, and the vehicle controller 16 processes the authenticating signal to determine whether the portable device 14 is authenticated with respect to the vehicle 12. If the controller 16 recognizes the authenticating signal as valid, then the method 100 continues at 106. If at 104, the controller 16 fails to receive a valid authenticating signal, then the method 100 ends at 110.

At 106, it may be determined whether the portable device 14 is within the predetermined proximity 24 of the vehicle 12. The vehicle 12 and the portable device 14 communicate to make this determination. In some embodiments, the vehicle controller 16 makes this determination. In additional embodiments, the portable controller 20 makes this determination. In the embodiment of FIG. 2, the controller 20" of the second portable device 14" makes this determination.

In some embodiments, an affirmative determination results at 106 if the portable controller 20 wirelessly connects with the vehicle controller 16 such that the portable device 14 and the vehicle 12 are able to exchange data and/or remotely control each other. Otherwise, if the portable controller 20 fails to wirelessly connect with the vehicle controller 16, then the method 100 ends at 110. Specifically, in some embodiments of 106, the portable controller 20 transmits (via the second transceiver 58) a wireless connection request signal, and the vehicle controller 16 processes the request and determines whether to accept it or not. In some embodiments, if the vehicle controller 16 accepts the request signal and wirelessly connects with the portable device 14, then the vehicle controller 16 determines that the portable device 14 is within the boundary 26 of proximity 24 to the vehicle 12, and the method 100 continues at 108. In contrast, if the vehicle controller 16 denies the wireless connection request or otherwise fails to wirelessly connect with the portable controller 20, then the method 100 ends at 110. In additional embodiments of 106, the portable controller 20 makes the connection determination of 106. Specifically, the vehicle controller 16 sends the wireless connection request to the portable controller 20, and the portable controller 20 determines whether to wirelessly connect with the vehicle controller 16. In further embodiments related to FIG. 2, the method 100 (at 106) additionally includes an attempt at wirelessly connecting the controller 20' of the first portable device 14' with the controller 20" of the second portable device 14", as well as an attempt at wirelessly connecting at least one of the controllers 20', 20" with the vehicle controller 16. Accordingly, if the portable controllers 20', 20" are close enough to wirelessly connect with each other and the vehicle controller 2016 wirelessly connects with at least one of the portable controllers 20', 20", then the vehicle controller 16 determines that both portable devices 14', 14" are within the boundary 26 of proximity 24 to the vehicle 12.

In further embodiments of 106, the vehicle location sensor 46 detects the geographical location of the vehicle 12, the portable location sensor 64 detects the geographical location of the portable device 14, and the vehicle controller 16 or the portable controller 20 compares the detected locations to determine whether the portable device 14 is within the proximity 24 of the vehicle 12. For example, in some embodiments, the vehicle controller 16 receives data from the vehicle location sensor 46 indicating the geographical location of the vehicle 12, and the vehicle controller 16 also receives (via the second transceiver 58) data indicating the geographical location of the portable device 14. Then, the vehicle controller 16 compares the two geographical locations to determine whether the portable device 14 is within the boundary 26 of proximity 24 to the vehicle. In other embodiments, the portable controller 20 receives data from the portable location sensor 64 indicating the geographical location of the portable device 14, and the portable controller 20 also receives (via the second transceiver 44)

data indicating the geographical location of the vehicle 12. Then, the portable controller 20 compares the two geographical locations to determine whether the portable device 14 is within proximity 24 of the vehicle 12. In these embodiments, if at 106 the portable device 14 is detected as being within the boundary 26 of proximity 24, the method 100 continues at 108; otherwise, the method 100 ends at 110. In some embodiments, the communication of location data between the vehicle 12 and the portable device 14 is secured via any one or more of commonly used encryption or hash techinques.

At 108, the system 10 grants the user access to one or more predetermined functions. For example, the vehicle controller 16 utilizes the lock control module 48 and sends control signals to the door lock 28 to unlock the vehicle door 30. In additional embodiments, the vehicle controller 16 utilizes the engine control module 50 to start the engine 32. In further embodiments, the vehicle controller 16, at 108, energizes a starter of the engine 32, allowing the user to selectively start the engine 32 at the push of a button, for example. Also, in some embodiments of 108 of the method 100, the vehicle controller 16 utilizes the display control module 52 to output a welcome message or other message on the vehicle display 34. In additional embodiments of 108 of the method 100, the portable controller 20 utilizes the display control module 66 to output a welcome message or other message on the portable display 36. In further embodiments of 108 relating to the system 10 of FIG. 2, the portable controller 20" communicates with the first portable device 14', causing the first controller 20' to utilize the vehicle control module 68' to generate vehicle control signals. The first portable transceiver 56' transmits those vehicle control signals to the first vehicle transceiver 42 for controlling the vehicle lock 28, engine 32, and/or the vehicle display 34.

Figure 4:
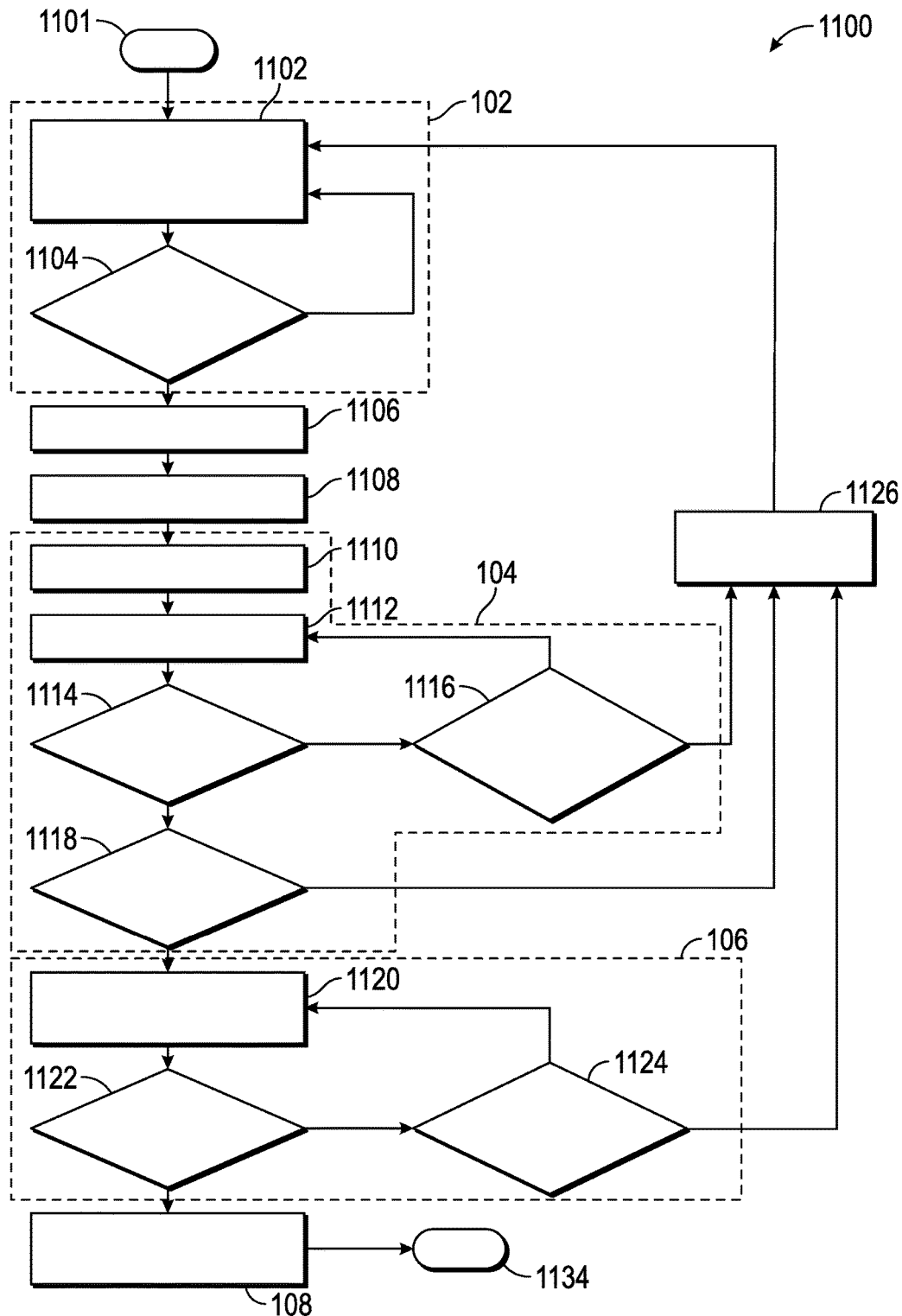
FIG. 4 is a flowchart illustrating the method of operating the passive access system according to additional embodiments of the present disclosure.

FIG. 4 illustrates additional embodiments of the method 1100 according to the present disclosure. The method 1100 of FIG. 4 corresponds to the method 100 of FIG. 3. For further illustration, 102, 104, 106, and 108 as discussed in relation to FIG. 3 are indicated in FIG. 4. Thus, the method 1100 exemplifies the method 100 of FIG. 3.

As shown, the method 1100 begins at 1101 and proceeds to 1102, wherein the vehicle controller 16 monitors for an authentication request signal from the portable device 14. In some embodiments, the authentication request results from the actuation of a control or device at the vehicle 12, such as an engine start button or door handle actuation. Next, at 1104, the vehicle controller 16 determines whether such an authentication request signal is received. If not, the method 1100 continuously loops between 1102, 1104 until the vehicle controller 16 receives the authentication request signal from the portable device 14.

Once the authentication request signal is received, then at 1106, the vehicle controller 16 enables the first transceiver 42 of the vehicle 12 for communications with the first transceiver 56 of the portable device 14. Next, at 1108, the controller 16 enables the second transceiver 44 for communications with the second transceiver 58.

Next, at 1110, the vehicle controller 16 sends a challenge signal to the portable device 14, via the first transceiver 42. Then, at 1112, the vehicle controller 16 monitors for any responses from the portable device 14. Subsequently, at 1114 the controller 16 determines whether any authentication signal responses have been received. If not, then at 1116, the controller 16 determines whether a predetermined time has elapsed before allowing the first transceiver 42, the second transceiver 44, and/or another device of the system 10 to enter sleep mode (at 1126).

If the vehicle controller 16 receives an authentication signal in response to the challenge signal at 1114, the method 1100 continues to 1118. At 1118, the controller 16 determines whether the received authentication response signal from the portable device 14 is valid.

If the response is invalid, the first transceiver 42, second transceiver 44, or other components of the system 10 enters sleep mode at 1126. However, if the controller 16 determines that the authentication signal is valid at 1118, then the method 1100 continues to 1120. At 1120, the vehicle controller 16 and the portable device 14 communicate via the second transceivers 44, 58 and attempt to wirelessly connect. In some embodiments of 1120 (e.g., when the second transceivers 44, 58 are BLUETOOTH™ transceivers), the vehicle controller 16 and the portable device 14 may transmit signals to discover each other and/or attempt to establish a wireless connection such that at least one of the devices may be used to remotely control a function of the other device. For example, in some embodiments, this wireless connection may enable the vehicle 12 to play an audio file that is stored in memory on the portable device 14, to make a phone call using the cellular connection of the portable device 14, etc.

Next, at 1122, the controller 16 determines whether the wireless connection is successfully established with the portable device 14. If unsuccessful, the controller 16 determines whether a predetermined connection time has been exceeded at 1124. If the connection time has been exceeded, then the method 1100 continues to 1126, and the first transceiver 42, second transceiver 44, or other component enters sleep mode. If, at 1124, the connection time has not been exceeded, the method 1100 loops back to 1120 for another attempt at establishing a wireless connection between the vehicle 12 and the portable device 14. The wireless connection attempt of 1120, 1122, and 1124 loops continuously until the connection time has been exceeded, as determined at 1124.

If, at 1122, the vehicle controller 16 wirelessly connects with the portable controller 20, then the method 1100 continues to 108. As discussed above in relation to FIG. 3, the method 1100 at 108 includes actuating the door lock 28, enabling start of the engine 32, and/or displaying a welcome message on the vehicle display 34 and/or the portable display 36. Subsequently, the method 1100 ends at 1134.

Figure 5:
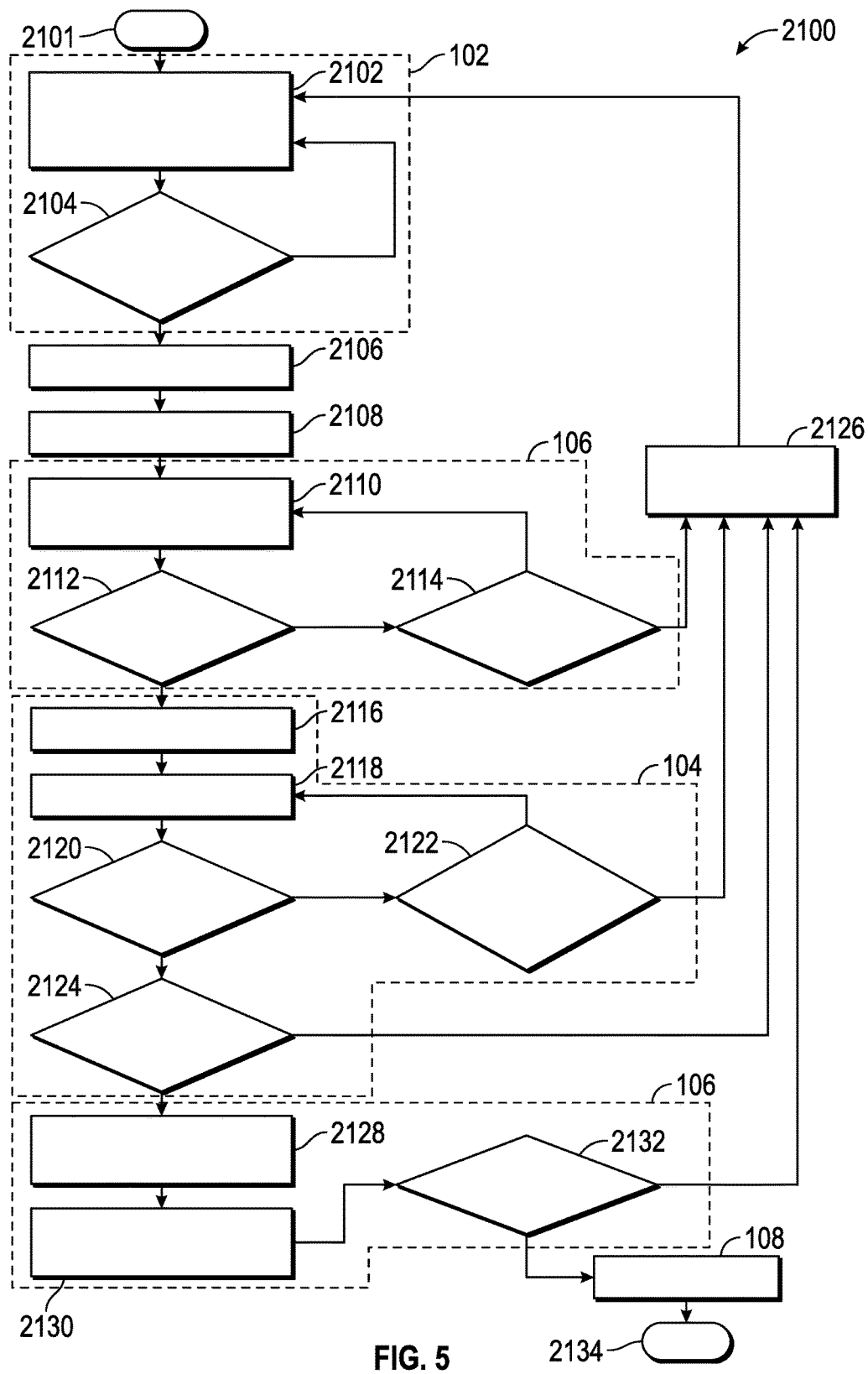
FIG. 5 is a flowchart illustrating the method of operating the passive access system according to additional embodiments of the present disclosure.

FIG. 5 illustrates additional embodiments of the method 2100. The method 2100 of FIG. 5 corresponds to the method 100 of FIG. 3. The method 2100 of FIG. 5 also shares similarities with the method 1100 of FIG. 4; however, portions of the method 2100 of FIG. 5 are sequenced differently as compared to the method 1100 of FIG. 4. Also, portions of the method 2100 of FIG. 5 in which the vehicle controller 16 determines whether the portable device 14 is within the boundary 26 of proximity 24 vary from that of the method 1100 of FIG. 4. Specifically, in the method 2100, the vehicle controller 16 receives data input corresponding to the detected geographical location of the portable device 14, and the vehicle controller 16 compares the geographical location of the portable device 14 to the detected geographical location of the vehicle 12 to determine proximity of the portable device 14.

After initiating at 2101, the method 2100 proceeds to 2102 and, then, to 2104. 2102 and 2104 correspond, respectively, with 1102 and 1104 of the method 1100 of FIG. 4. Next, the method 2100 proceeds to 2106 and 2108, which correspond, respectively, with 1106 and 1108 of the method 1100 of FIG. 4.

Next, the method 2100 continues at 2110, in which the vehicle controller 16 and the portable controller 20 attempt to wirelessly connect together (e.g., similar to 1120 of the method 1100 of FIG. 4) via communications between the second transceiver 44 and the second transceiver 58. If, at 2112, the wireless connection attempt is initially unsuccessful, the method 2100 continues to 2114, wherein the controller 16 determines whether the predetermined connection time has been exceeded. If the connection has been exceeded, then at 2126, the first transceiver 42, the second transceiver 44, and/or another component of the system 10 enters sleep mode. If, at 2114, the connection time has not been exceeded, the method 2100 loops back to 2110 and, then, to 2112 until the wireless connection has been established.

If, at 2112, the vehicle controller 16 wirelessly connects with the portable controller 20, the method 2100 continues to 2116. At 2116, the vehicle controller 16 sends a challenge signal to the portable device 14 using the first transceiver 42. Then, at 2118, the vehicle controller 16 monitors for authentication signal responses from the portable device 14 received via the first transceiver 42. If, at 2120, the vehicle controller 16 determines that no response has been received, the method continues to 2122, wherein the controller 16 determines whether the predetermined time for authentication has elapsed. If the time has elapsed, then the method 2100 continues to 2126 and one or more components of the system 10 enters sleep mode. However, at 2122, if the time has not elapsed, the method 2100 loops back to 2118 and, then, to 2120 until an authentication signal response has been received. Then, at 2124, the controller 16 determines whether the authentication signal response is valid. If the response is invalid, the method 2100 continues to 2126, where one or more components enter sleep mode.

If the controller 16 determines that the authentication signal response is valid, then the method 2100 continues to 2128. At 2128, the vehicle controller 16 receives a signal, via the second transceiver 44, corresponding to a detected geographical location of the portable device 14.

Next, at 2130, the vehicle controller 16 compares the geographical location of the portable device 14 (according to the signal received at 2128) to the geographical location of the vehicle 12 (as detected by the vehicle location sensor 46).

Subsequently, at 2132, the vehicle controller 16 determines whether the portable device 14 is within the boundary 26 of proximity 24 to the vehicle 12 according to the comparison performed at 2130. If the controller 16 determines that the portable device 14 is outside the boundary 26, then the method 2100 proceeds to 2126, wherein one or more components enters sleep mode. If, on the other hand, the controller 16 determines that the portable device 14 is within the boundary 26, then the method 2100 proceeds to 108, and access may be granted to the predetermined function (e.g., unlocking of the door 30, energizing the starter of the engine 32, and/or displaying a message on the vehicle display 34 and/or the portable display 36). Then, the method 2100 ends at 2134.

Accordingly, the system 10 and methods 100, 1100, 2100 of the present disclosure provides a high level of security and effectively limits access to would-be unauthorized users. This is because the system 10 not only authenticates the portable device(s) 14, 14', 14" with respect to the vehicle 12, the system 10 also confirms that the portable devices 14, 14' 14" are within proximity of the vehicle 12.

Also, in some embodiments, a ride share system and/or autonomous vehicle system employs the system 10 and its methods 100, 1100, 2100. For example, in some embodiments, the vehicle 12 is an autonomous vehicle (i.e., drives without a human driver), and the vehicle controller 16 restricts access to only authorized users according to the methods 100, 1100, 2100 described herein. Also, in this scenario, the autonomous vehicle is used in a ride sharing system, and the vehicle controller 16 similarly restricts access to only authorized users according to the methods 100, 1100, 2100 of the present disclosure. In some embodiments, the portable device 14 runs a specific application or program used to perform at least part of the method 100, 1100, 2100 for authentication of the portable device 14 with respect to the vehicle 12 and/or for determining whether the portable device 14 is proximate the vehicle 12.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling access to a predetermined function of a component within a system that includes a vehicle with a vehicle controller, a first portable device with a first portable controller, and a second portable device with a second portable controller, the method comprising:
   communicating, between the vehicle controller, the first portable controller, and the second portable controller, a plurality of signals, the plurality of signals including an authentication signal and a wireless connection request signal;
   processing, by at least one of the vehicle controller, the first portable controller, and the second portable controller, the authentication signal during an authentication confirmation process to determine authentication of at least one of the first and second portable devices with respect to the vehicle;
   processing, by at least one of the vehicle controller, the first portable controller, and the second portable controller, the wireless connection request signal during a proximity confirmation process to determine whether the vehicle controller and at least one of the first and second portable controllers are connected for wireless communication;
   determining, during the proximity confirmation process, that the first and second portable devices are within a predetermined proximity of the vehicle when:
     the first portable controller and the second portable controller are connected together for wireless communication; and
     the vehicle controller is connected with at least one of the first portable controller and the second portable controller; and
   providing access to the predetermined function of the component when both:
     the at least one of the first and second portable devices is authenticated with respect to the vehicle according to the authentication confirmation process; and the first and second portable devices are within the predetermined proximity of the vehicle according to the proximity confirmation process.

2. The method of claim 1, wherein providing access to the predetermined function includes at least one of:
   unlocking a door of the vehicle;
   energizing a starter of a vehicle engine;
   displaying a message on a vehicle display of the vehicle; and
   displaying a message on a portable display of the at least one portable device.

3. The method of claim 1, further comprising:
   detecting a vehicle geographical location of the vehicle;
   detecting a portable device geographical location of at least one of the first portable device and the second portable device; and
   comparing, by at least one of the vehicle controller, the first portable controller, and the second portable controller, the detected vehicle geographical location to the portable device geographical location during the proximity confirmation process to determine whether the first and second portable devices are within the predetermined proximity of the vehicle.

4. The method of claim 3,
   further comprising comparing, by the vehicle controller, the detected vehicle geographical location of the vehicle to the detected portable device geographical location.

5. The method of claim 3,
   further comprising comparing, by at least one of the first portable controller and the second portable controller, the detected portable device geographical location to the detected vehicle geographical location.

6. The method of claim 1, further comprising:
   sending, by the vehicle controller, a challenge signal; and
   receiving, by the vehicle controller from at least one of the first portable controller and the second portable controller, the authentication signal in response to the challenge signal.

7. The method of claim 1, wherein
   communicating the plurality of signals includes:
      communicating the authentication signal using a first communication protocol; and
      communicating the wireless connection request location based signal using a second communication protocol; and
   wherein the first communication protocol is a first radio communication protocol and the second communication protocol is a second radio communication protocol that is out-of-band from the first radio communication protocol.

8. A vehicle configured to control access to a function according to wireless communications with a first portable device and a second portable device, the vehicle comprising:
   a vehicle controller including an authentication module and a location module;
   a vehicle communication device configured to wirelessly communicate with at least one of the first portable device and the second portable device using a first communication protocol and a second communication protocol; and
   a vehicle component configured to selectively perform a predetermined function;
   the vehicle controller configured to receive, via the vehicle communication device and using the first communication protocol, an authentication signal from at least one of the first portable device and the second portable device;
   the vehicle controller configured to receive, via the vehicle communication device and using the second communication protocol, a wireless connection request signal from at least one of the first portable device and the second portable device;
   the vehicle controller configured to process the authentication signal during an authentication confirmation process to determine authentication of at least one of the first portable device and the second portable device with respect to the vehicle;
   the vehicle controller configured to process the wireless connection request signal during a proximity confirmation process to determine whether the vehicle controller and at least one of the first and second portable devices are connected for wireless communication;
   the vehicle controller configured to determine, during the proximity confirmation process, whether the first and second portable devices are within a predetermined proximity of the vehicle based on whether:
      the vehicle wirelessly connects with at least one of the first and second portable devices; and
      the first portable device and the second portable device connect together for wireless communication;
   the vehicle controller configured to send a control signal to the vehicle component for performing the predetermined function when both:
      the at least one of the first portable device and the second portable device is authenticated with respect to the vehicle according to the authentication confirmation process; and
      the first and second portable devices are within the predetermined proximity of the vehicle according to the proximity confirmation process.

9. The vehicle of claim 8, wherein the first portable device is configured to provide the authentication signal to the vehicle controller; and
   wherein the second portable device is configured to provide the wireless connection request signal to the vehicle controller.

10. The vehicle of claim 8, wherein the first communication protocol and the second communication protocol are both radio communication protocols, and wherein the first communication protocol is out-of-band as compared to the second communication protocol.

11. The vehicle of claim 8,
    wherein the vehicle component is at least one of:
       a door lock for a door of a vehicle;
       a starter of an engine of the vehicle; and
       a display; and
    wherein the predetermined function is at least one of:
       an unlock function of the door lock;
       an energization function of the starter of the engine; and
       a display function of the display.

12. The vehicle of claim 8, further comprising a sensor configured to detect a geographical location of the vehicle, the vehicle location signal corresponding to the geographical location of the vehicle;
    wherein the vehicle controller is configured to receive a location signal from at least one of the first portable device and the second portable device, the location signal corresponding to a detected geographical location of the at least one of the first portable device and the second portable device; and wherein the vehicle controller, during the proximity confirmation process, is configured to compare the geographical location of the vehicle to the geographical location of the at least one of the first portable device and the second portable device.

13. A method for controlling access to a predetermined function of a component of a vehicle based on wireless communications between the vehicle and a portable device, the vehicle including a vehicle controller and the portable device including a portable device controller, the method comprising:
- transmitting, from the vehicle to the portable device, a challenge signal;
- receiving, by the vehicle, an authentication signal from the portable device in response to the challenge signal;
- processing, by the vehicle controller, the authentication signal during an authentication confirmation process to determine authentication of the portable device with respect to the vehicle;
- receiving, by the vehicle, a location signal from the portable device, the location signal corresponding to a detected geographical location of the portable device;
- detecting, by the vehicle controller, a geographical location of the vehicle;
- processing, by the vehicle controller, the location signal during a proximity confirmation process, including comparing the detected geographical location of the portable device to the detected geographical location of the vehicle to determine whether the portable device is within a predetermined proximity of the vehicle; and
- providing, by the vehicle controller, access to the predetermined function of the component of the vehicle when both:
  - the portable device is authenticated with respect to the vehicle according to the authentication confirmation process; and
  - the portable device is within the predetermined proximity of the vehicle according to the proximity confirmation process.

14. The method of claim 13, wherein providing access to the predetermined function includes at least one of:
- unlocking a door of the vehicle;
- energizing a starter of a vehicle engine; and
- displaying a message on a vehicle display of the vehicle.

15. The method of claim 13, wherein transmitting the challenge signal and receiving the authentication signal is performed using a first communication protocol;
- wherein receiving the location signal is performed using a second communication protocol; and
- wherein the first communication protocol is a first radio communication protocol and the second communication protocol is a second radio communication protocol that is out-of-band from the first radio communication protocol.

* * * * *